United States Patent
Yanagawa et al.

(10) Patent No.: US 9,333,943 B2
(45) Date of Patent: May 10, 2016

(54) WEBBING TAKE-UP DEVICE

(71) Applicant: KABUSHIKI KAISHA TOKAI-RIKA-DENKI-SEISAKUSHO, Aichi-ken (JP)

(72) Inventors: Wataru Yanagawa, Aichi-ken (JP); Masaru Ukita, Aichi-ken (JP); Hitoshi Takamatsu, Aichi-ken (JP)

(73) Assignee: KABUSHIKI KAISHA TOKAI-RIKA-DENKI-SEISAKUSHO, Aichi-ken (JP)

( * ) Notice: Subject to any disclaimer, the term of this patent is extended or adjusted under 35 U.S.C. 154(b) by 102 days.

(21) Appl. No.: 13/796,288

(22) Filed: Mar. 12, 2013

(65) Prior Publication Data
US 2013/0256442 A1    Oct. 3, 2013

(30) Foreign Application Priority Data

Mar. 30, 2012  (JP) ................. 2012-082809

(51) Int. Cl.
*B60R 22/38* (2006.01)
*B60R 22/415* (2006.01)

(52) U.S. Cl.
CPC .................... *B60R 22/415* (2013.01)

(58) Field of Classification Search
CPC ................. B60R 22/415; B60R 22/41; B60R 2022/4825
USPC ................. 242/382, 382.1, 382.2, 383, 383.1, 242/383.4
See application file for complete search history.

(56) References Cited

U.S. PATENT DOCUMENTS

| | | | | |
|---|---|---|---|---|
| 4,088,281 A | * | 5/1978 | Close | 242/375.3 |
| 4,483,494 A | * | 11/1984 | Takada | 242/372 |
| 4,726,539 A | * | 2/1988 | Schmidt et al. | 242/382.2 |
| 4,767,082 A | * | 8/1988 | Schmidt et al. | 242/382.2 |
| 4,896,844 A | * | 1/1990 | Gavagan et al. | 280/807 |
| 5,505,400 A | * | 4/1996 | Boelstler et al. | 242/382.2 |
| 5,507,447 A | | 4/1996 | Corrion et al. | |
| 5,520,350 A | * | 5/1996 | Doty et al. | 242/385.3 |
| 5,794,879 A | * | 8/1998 | Huber | 242/382.2 |

(Continued)

FOREIGN PATENT DOCUMENTS

| | | | | |
|---|---|---|---|---|
| JP | 07-277138 | * | 10/1995 | B60R 22/36 |
| JP | 7277137 | | 10/1995 | |

(Continued)

OTHER PUBLICATIONS

Japanese Office Action dated Jul. 14, 2015 and English translation of notice of reasons for rejection.

*Primary Examiner* — Emmanuel M Marcelo
*Assistant Examiner* — Justin Stefanon
(74) *Attorney, Agent, or Firm* — Roberts Mlotkowski Safran & Cole, PC

(57) ABSTRACT

A restriction rotating body is provided at a carrier plate, on the opposite side of a sun gear to a planet gear. When an internal-toothed gear is displaced together with a sensor gear in the rotation radial direction thereof, the internal-toothed gear presses a shaft portion of the restriction rotating body, and further, a gear portion of the restriction rotating body presses the sun gear. Due thereto, the amount of relative displacement of the internal-toothed gear with respect to the sun gear can accordingly be reduced. Moreover, since the restriction rotating body does not mesh with the internal-toothed gear, the restriction rotating body can be easily assembled after assembly of the planet gear. The planet gear can accordingly be easily assembled prior to assembly of the restriction rotating body.

12 Claims, 3 Drawing Sheets

(56) References Cited

U.S. PATENT DOCUMENTS

| | | | |
|---|---|---|---|
| 6,499,554 B1 * | 12/2002 | Yano et al. | 180/268 |
| 6,604,597 B2 * | 8/2003 | Fujii et al. | 180/268 |
| 6,702,056 B2 * | 3/2004 | Tanaka et al. | 180/269 |
| 6,910,653 B2 * | 6/2005 | Tanji | 242/390.8 |
| 7,380,740 B2 * | 6/2008 | Tanaka et al. | 242/374 |

FOREIGN PATENT DOCUMENTS

| | | |
|---|---|---|
| JP | 2002-250408 | 9/2002 |
| JP | 2007-76536 | 3/2007 |
| JP | 2010-30375 | 2/2010 |
| JP | 2010-101340 | 5/2010 |

* cited by examiner

WEBBING TAKE-UP DEVICE

CROSS-REFERENCE TO RELATED APPLICATION

This application claims priority under 35 USC 119 from Japanese Patent Application No. 2012-082809 filed Mar. 30, 2012, the disclosure of which is incorporated by reference herein.

BACKGROUND OF THE INVENTION

1. Field of the Invention

The present invention relates to a webbing take-up device that takes up and stores webbing.

2. Related Art

A webbing take-up device configuring a vehicle seatbelt device is equipped with a locking mechanism such as an emergency locking retractor (this type of locking mechanism is referred to below as an "ELR mechanism") that is actuated to restrict rotation of a spool in a pull-out direction when the vehicle decelerates suddenly, or when the spool that takes up and stores the webbing is rotated sharply in the pull-out direction. There is also a locking mechanism such as an automatic locking retractor (this type of locking mechanism is referred to below as an "ALR mechanism") that, unlike the ELR mechanism, in an actuated state always permits rotation of the spool only in a take-up direction, whilst restricting rotation of the spool in the pull-out direction. Recently, ALR mechanisms are being employed for example for fixing a child seat mounted on a vehicle seat.

In the ELR mechanism and the ALR mechanism, structural components are common with configuration wherein the locking mechanism is forcibly actuated in a state in which a specific length of webbing has been pulled out (for example a state in which the entire webbing has been pulled out from the spool), and the actuated state of the locking mechanism is maintained up to the point at which a specific length of the webbing has been taken up onto the spool.

Configurations employing a planetary gear mechanism are used for switching between the ELR mechanism and the ALR mechanism (see for example Japanese Patent Application Laid-Open (JP-A) No. 7-277137). In such configurations, a sun gear that rotates integrally with the spool configures an input gear of the planetary gear mechanism, and a carrier plate that supports a planet gear configures the output of the planetary gear mechanism. Rotation of the spool in the pull-out direction is transmitted to the carrier plate with being reduced, and when a specific length of the webbing has been pulled out, the carrier plate operates a switching section that switches between the ELR mechanism and the ALR mechanism, thereby switching from the ELR mechanism to the ALR mechanism. The carrier plate operates the switching section and switches from the ALR mechanism to the ELR mechanism when the spool has rotated in the take-up direction to the point at which a specific amount of webbing has been taken up onto the spool from the ALR mechanism state.

Generally, planetary gear mechanisms are configured such that a planet gear meshes with a sun gear, and the planet gear also meshes with an internal-toothed gear that is coaxial to the sun gear. The planetary gear mechanism can thus be achieved (can operate) with a single planet gear. However, in a case in which there is a single planet gear present, displacement of the internal-toothed gear may occur such that, at the meshing portion of the planet gear and the internal-toothed gear, the internal-toothed gear moves apart therefrom in the internal-toothed gear radial direction. In consideration of this issue, the rigidity of each gear, and the rigidity of portions that support each of the gears configuring the planetary gear mechanism is set high in such configurations. It is accordingly difficult to achieve a small size for each of the gears.

Configuration may be made wherein for example two planet gears are disposed facing each other across the sun gear. In such a configuration, when displacement of the internal-toothed gear occurs such that, at the meshing portion of the internal-toothed gear and one of the planet gears, the internal-toothed gear moves apart therefrom in the internal-toothed gear radial direction, the internal-toothed gear presses the other planet gear towards the sun gear side. The thus pressed other planet gear presses the sun gear towards the one planet gear side, and the sun gear then presses the one planet gear towards the internal-toothed gear meshing portion side. Accordingly, in such a configuration, the pressing force of the sun gear acts to maintain the meshing of the one planet gear and the internal-toothed gear even when displacement of the internal-toothed gear such as described above occurs.

However, it is difficult to mesh the planet gears properly with both the sun gear and the internal-toothed gear without both appropriate rotation positions of the planet gears about their respective axial centers and appropriate rotation positions of the planet gears about the sun gear. In particular, in a case in which plural planet gears are employed, assembly is difficult from the second planet gear (and the subsequent planet gears).

SUMMARY OF THE INVENTION

In consideration of the above circumstances, the present invention is directed towards obtaining a webbing take-up device that has a planetary gear mechanism that has easy planet gear assembly and that can maintain good meshing between each of the gears configuring the planetary gear mechanism without these gears requiring particularly high rigidity.

A webbing take-up device of a first aspect of the present invention includes: a spool to which a length direction base end side of a webbing is anchored, and that takes up and stores the webbing by rotating in a take-up direction; a sun gear that rotates integrally with the spool or that rotates according to the spool; an internal-toothed gear that is provided coaxially to the sun gear and to the outside of the sun gear; a planet gear that is provided at one lateral side of the sun gear, that meshes with both the sun gear and the internal-toothed gear, and to which rotation of the sun gear is transmitted such that the planet gear revolves around the sun gear while rotating about a rotation axis thereof, a reduction ratio being set such that a number of revolutions of the planet gear is less than one revolution for a number of rotations of the spool that is required from a specific take-up state in which a specific length of the webbing is taken up on the spool to reach a fully pulled-out state in which the webbing is completely pulled out from the spool; a locking mechanism that is actuated to restrict rotation of the spool in a pull-out direction that is the opposite direction from the take-up direction while permitting rotation of the spool in the take-up direction; a switching section that is capable of coaxial relative rotation with respect to the sun gear, that rotatably supports the planet gear, that rotates relative to the sun gear due to revolution of the planet gear, that actuates the locking mechanism due to the switching section reaching a rotation position thereof corresponding to the fully pulled-out state of the spool, and that releases actuation of the locking mechanism due to the switching section reaching a rotation position corresponding to the specific take-up state of the spool; and a restriction member that is provided at another lateral side of the sun gear, that is configured such that rotation of the sun gear is not transmitted to the switching section, and that causes the sun gear to follow displacement of the internal-toothed gear with respect to the sun gear along a rotation radial direction of the sun gear.

In the webbing take-up device of the first aspect, when the spool rotates in the pull-out direction due to the webbing being pulled out, the sun gear rotates in a specific direction. The planet gear that is rotatably supported by the switching section meshes with the sun gear, and the planet gear rotates about the rotation axis thereof due to rotation of the sun gear. The planet gear meshes with the internal-toothed gear provided coaxially to the sun gear. Accordingly, when the planet gear rotates according to the rotation of the sun gear, the planet gear revolves around the sun gear with a speed reduced with a specific reduction ratio (namely, a reduction ratio wherein number of revolution of the planet gear is less than one revolution for number of rotations of the spool which is required from a specific take-up state to reach a fully pulled-out state, described later) with respect to the rotation speed of the sun gear (the number of rotations).

The planet gear is rotatably supported by the switching section, configured as a carrier, that is capable of coaxial rotation with respect to the sun gear. The switching section accordingly rotates around the sun gear in accompany of the planet gear when the planet gear revolves around the sun gear. The switching section rotates around the sun gear in this manner according to the rotation of the spool in the pull-out direction, due thereto, the switching section accordingly switches the locking mechanism to an actuated state when the spool becomes the fully pulled-out state. When the locking mechanism is thus actuated, the spool is able to rotate in the take-up direction, but cannot rotate in the pull-out direction.

On the other hand, the switching section releases the actuated state of the locking mechanism when the spool rotates from this state in the take-up direction up to the specific take-up state in which the webbing the specific length is taken up onto the spool. The spool accordingly becomes capable of rotation in the pull-out direction.

The webbing take-up device according to the present invention is equipped with the restriction member. When the internal-toothed gear is displaced relative to the sun gear in the sun gear rotation radial direction, the restriction member causes the sun gear follow this displacement. Meshing between the planet gear and the sun gear and meshing between the internal-toothed gear and the planet gear can accordingly be well-maintained even in a case in which the rigidity of the planet gear, the sun gear and the internal-toothed gear, and the rigidity of portions supporting these gears, is not set particularly high.

Moreover, the restriction member does not transmit the rotation of the sun gear to the switching section. There is accordingly no need for the restriction member to mesh with both the sun gear and the internal-toothed gear in a similar manner to the planet gear. Assembly of the restriction member is accordingly easy.

A webbing take-up device of a second aspect of the present invention is the first aspect of the present invention further including a rotating member that is capable of rotating about an axis with an axial direction in the same direction as a rotation axial direction of the sun gear, and that actuates the locking mechanism by rotating, wherein the internal-toothed gear is formed at the rotating member.

The webbing take-up device of the second aspect of the present invention is provided with the rotating member that is capable of rotating about the axis with axial direction in the same direction as the sun gear rotation axial direction, and the rotating member rotates to actuate the locking mechanism.

The rotating member is further formed with the internal-toothed gear with which the planet gear meshes. Configuration is made wherein the rotating member can rotate about the axis with axial direction in the same direction as the sun gear rotation axial direction as described above. The rotating member is accordingly capable of displacement in the rotation radial direction with respect to the support portion that supports the rotating member. However, even when the rotating member displaces in the rotating radial direction and due thereto the internal-toothed gear is displaced relative to the sun gear in the sun gear rotation radial direction, the restriction member causes the sun gear follow this displacement. Meshing between the planet gear and the sun gear and meshing between the internal-toothed gear and the planet gear can accordingly be well-maintained.

A webbing take-up device of a third aspect of the present invention is the first aspect or the second aspect of the present invention wherein the restriction member is rotatably supported by the switching section.

In the webbing take-up device of the third aspect, the restriction member is supported by the switching section. The switching section rotates around the sun gear in accompany of the planet gear as described above. The restriction member supported by the switching section accordingly revolves around the sun gear together with the planet gear. A uniform separation between the planet gear and the restriction member around the sun gear can accordingly be maintained.

A webbing take-up device of a fourth aspect of the present invention is any one of the first aspect to the third aspect of the present invention wherein the restriction member is provided on the opposite side of the sun gear from the planet gear.

In the webbing take-up device of the fourth aspect, the restriction member is provided on the opposite side of the sun gear to the planet gear. When the sun gear is displaced by pressing force (pressing reactive force) from the planet gear, the restriction member interferes on the sun gear from the opposite side of the sun gear to the planet gear, and displacement of the sun gear can accordingly be effectively suppressed.

A webbing take-up device of a fifth aspect of the present invention is the third aspect or the fourth aspect of the present invention wherein the restriction member is configured to include a gear portion that meshes with the sun gear.

According to the webbing take-up device of the fifth aspect, the restriction member is provided with the gear portion and the gear portion meshes with the sun gear (for example, meshes with the sun gear at a portion thereof which is at the opposite side from the planet gear). When the sun gear is displaced by pressing force (pressing reactive force) from the planet gear so that the axial direction is tilted, the gear portion of the restriction member acts (resists) against this displacement, and tilting displacement of the axial direction of the sun gear is suppressed.

In the third aspect, the configuration is possible in that the planet gear includes a large diameter gear portion, and a small diameter gear portion provided integrally with and coaxially to the large diameter gear portion, the restriction member includes a gear portion, and an axial portion provided integrally with and coaxially to the gear portion, the large diameter gear portion meshes with the sun gear and the gear portion meshes with the sun gear, the small diameter gear portion meshes with the internal-toothed gear, and the restriction member does not have a portion that meshes with the internal-toothed gear.

Further, in addition thereto, the configuration is possible in that the small diameter gear portion is rotatably inserted in a first hole portion formed in the switching section to meshes with the internal-toothed gear, and the axial portion is rotatably inserted in a second hole portion formed in the switching section, the axial portion not meshing with the internal-toothed gear.

Further, in addition thereto, the configuration is possible in that the large diameter gear portion meshes with the sun gear at the opposite side of the sun gear from the gear portion.

As described above, the webbing take-up device of the present invention has easy planet gear assembly and can also suppress displacement of the sun gear such as axial wobbling.

BRIEF DESCRIPTION OF THE DRAWINGS

Embodiments of the invention will be described in detail with reference to the following figures, wherein.

DETAILED DESCRIPTION OF THE INVENTION

Configuration of an Exemplary Embodiment

Figure 1:
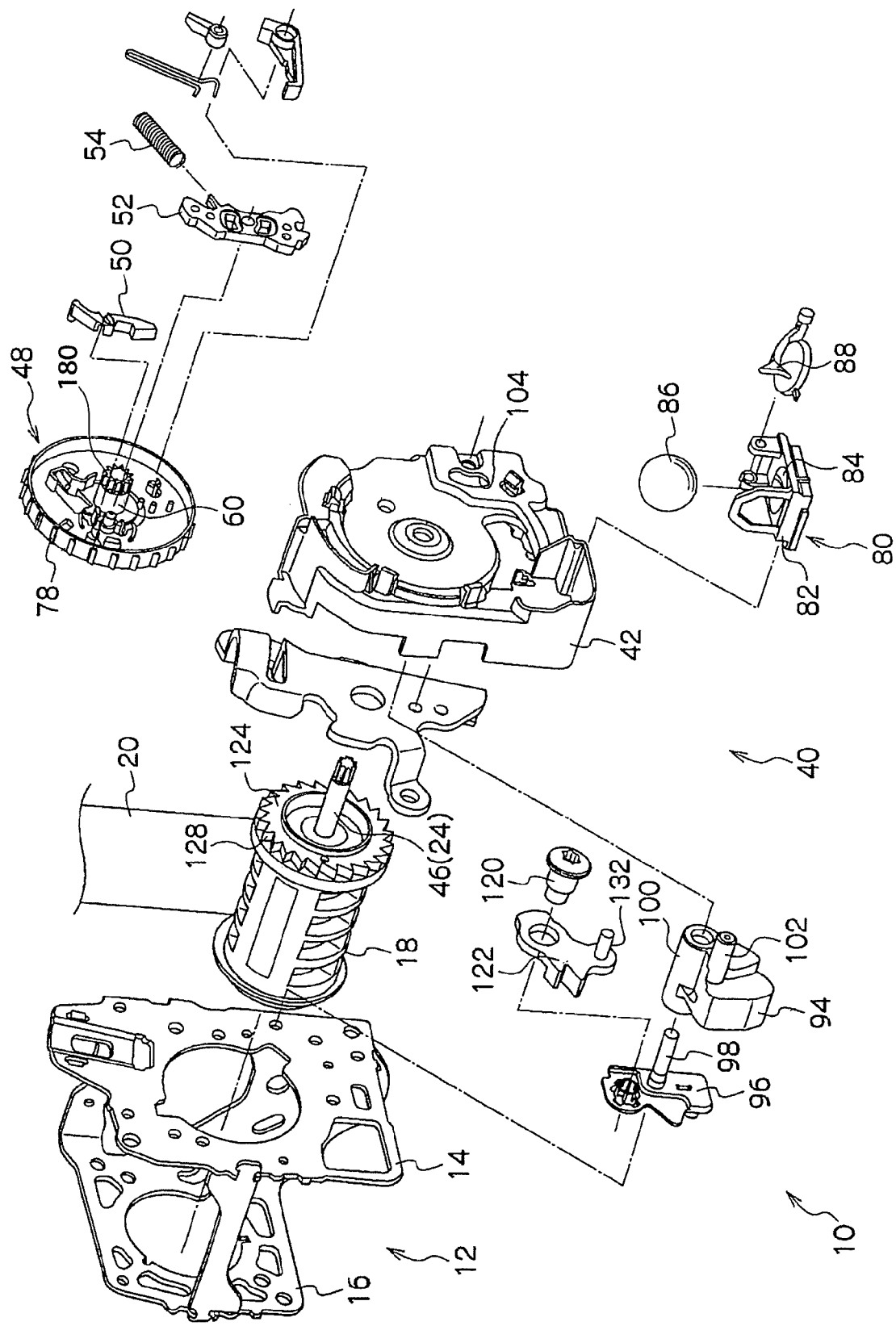
FIG. 1 is an exploded schematic perspective view illustrating a configuration of a webbing take-up device according to an exemplary embodiment of the present invention.
Figure 2:
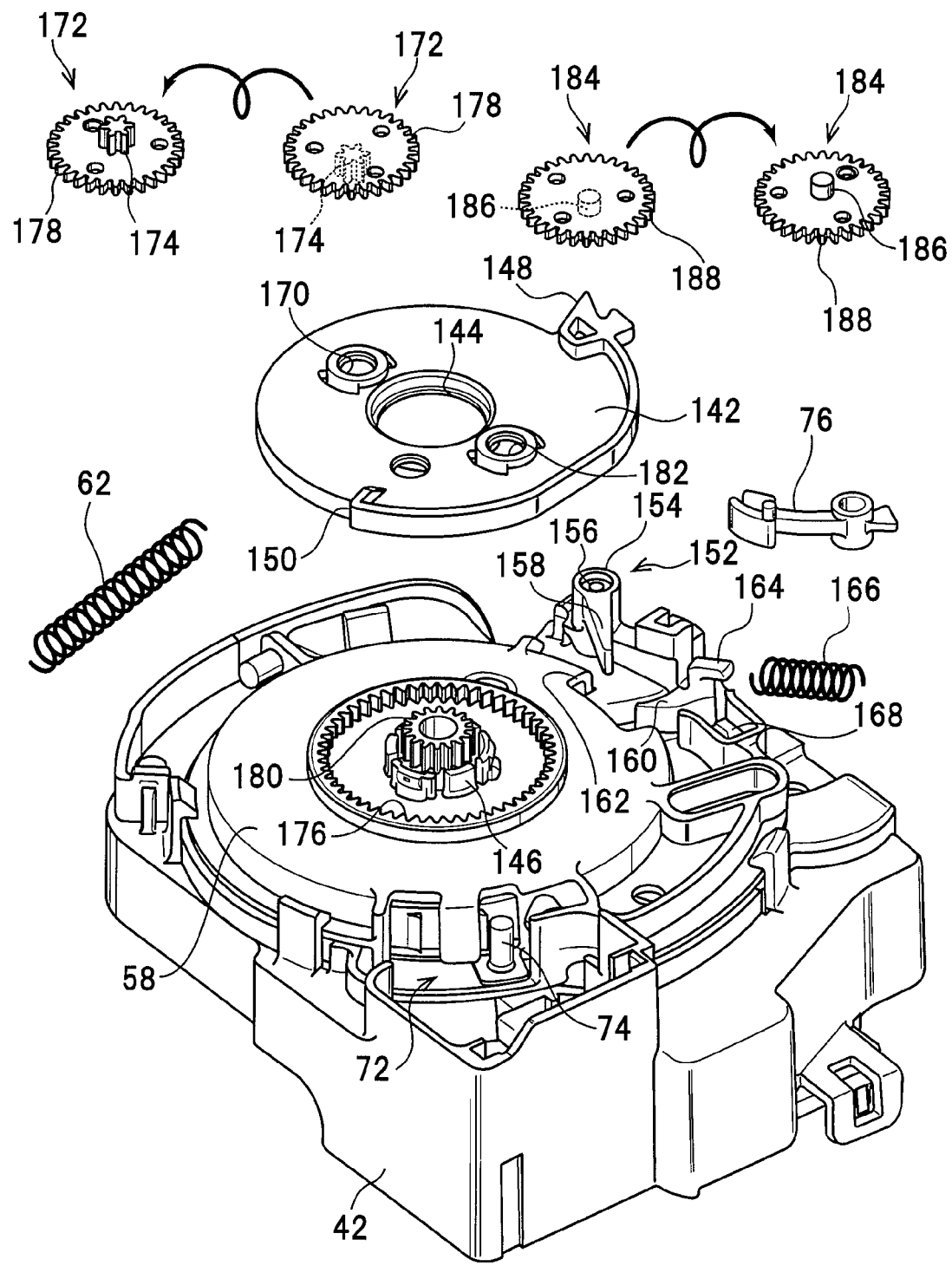
FIG. 2 is, as a continuation of the configuration shown in FIG. 1, an exploded schematic perspective view illustrating a configuration of relevant parts of a webbing take-up device according to a present exemplary embodiment of the present invention.

FIG. 1 is an exploded perspective view illustrating an outline configuration of a webbing take-up device 10 according to an exemplary embodiment of the present invention. As a continuation of the configuration illustrated in FIG. 1, FIG. 2 is an exploded perspective view illustrating the configuration of relevant portions of the webbing take-up device 10.

As shown in FIG. 1, the webbing take-up device 10 is provided with a frame 12. The frame 12 is provided with for example a pair of leg plates 14, 16 that face each other substantially along the vehicle front-rear direction. A spool 18 is provided between the leg plate 14 and the leg plate 16. The spool 18 is formed in a substantially circular cylindrical shape with the axial direction aligned along the facing direction of the leg plates 14, 16.

A length direction base end side of an elongated strap shaped webbing 20 is anchored to the spool 18. The webbing 20 is taken up and stored at an outer peripheral portion of the spool 18 from a length direction base end side when the spool 18 is rotated in a take-up direction that is one direction about the axial center of the spool 18. When the webbing 20 is pulled towards the leading end side, the webbing 20 that is taken up on the spool 18 is pulled out, and the spool 18 rotates in a pull-out direction that is opposite to the take-up direction. A state in which the spool 18 cannot take up any more of the webbing 20 is referred to below as a "specific take-up state", and a state in which the webbing 20 has been completely pulled out from the spool 18 is referred to below as a "fully pulled-out state".

A rod shaped torsion shaft 24 is disposed inside the spool 18 with its length direction aligned with the axial center of the spool 18. The torsion shaft 24 is connected to the spool 18 in the vicinity of a leg plate 16 side end portion of the spool 18, in a state in which the torsion shaft 24 is not capable of relative rotation with respect to the spool 18.

A spool biasing section, not shown in the drawings, configured for example by a spiral spring provided to the outside of the leg plate 16 (the opposite side of the leg plate 16 to the leg plate 14), is connected to an end portion on the leg plate 16 side of the torsion shaft 24. Biasing force is generated in the spool biasing section when the torsion shaft 24 rotates together with the spool 18 in the pull-out direction. This biasing force rotates the spool 18 in the take-up direction through the torsion shaft 24. The spool 18 is thereby capable of taking up the webbing 20.

A sensor holder 42 of a locking mechanism 40 is attached to the leg plate 14 at the outside of the leg plate 14 (the opposite side of the leg plate 14 to the leg plate 16). The sensor holder 42 is formed with a recessed shape partially open towards the leg plate 14 side. A sensor cover, not shown in the drawings, is provided to the opposite side of the sensor holder 42 to the leg plate 14 side. The sensor cover covers the sensor holder 42 and rotatably supports a shaft portion 46 that extends from the other end side of the torsion shaft 24 and passes through the sensor holder 42.

A V-gear 48 is provided on the opposite side of the sensor holder 42 to the leg plate 14 (namely between the sensor holder 42 and the sensor cover). The V-gear 48 is molded overall from a synthetic resin material to form a shallow-bottomed circular cylinder shape (dish shape) that is open along the spool 18 axial direction towards the opposite side of the spool 18 to the leg plate 14. The V-gear 48 is integrally attached coaxially to the shaft portion 46. A W-pawl 50 is provided at a position at a separation to the axial center of the V-gear 48 in the V-gear 48 radial direction. A base end side of the W-pawl 50 is supported by the V-gear 48 so as to be capable of swinging about an axis with axial direction in the same direction as the axial center of the V-gear 48. A leading end side of the V-gear 48 moves towards and away from the outer edge of the V-gear 48 by swinging about the support position.

An inertia mass 52 is provided to the V-gear 48. The inertia mass 52 is supported by the V-gear 48 so as to be capable of swinging about an axis with axial direction in the same direction as the axial center of the V-gear 48. The inertia mass 52 accordingly presses the W-pawl 50 when the inertia mass 52 supported by the V-gear 48 relatively turns (swings) in the take-up direction with respect to the V-gear 48, causing the leading end side of the W-pawl 50 to approach the outer edge of the V-gear 48. A compression coil spring 54 is provided to the side of the inertia mass 52. A one end of the compression coil spring 54 is engaged with the inertia mass 52, biasing the inertia mass 52 in the pull-out direction.

As shown in FIG. 2, a sensor gear 58 serving as a rotating member is provided to the opposite side of the V-gear 48 to the leg plate 14. The sensor gear 58 is formed by molding in a synthetic resin material. The sensor gear 58 is supported so as to be capable of turning by a circular cylinder shaped boss 60 formed to the V-gear 48, such that the shaft portion 46 penetrates the sensor gear 58. The sensor gear 58 is configured with a shallow bottomed circular cylinder shape (dish shape) that is open towards the leg plate 14 side, with the V-gear 48 disposed inside the sensor gear 58. A return spring 62 is provided in the vicinity of the sensor gear 58. The return spring 62 is configured by for example a compression coil spring, and biases the sensor gear 58 in the take-up direction with a biasing force that increases when the sensor gear 58 turns about the boss 60 in the pulling out direction.

At an anchoring position of the sensor gear 58 to the return spring 62, a portion of the sensor gear 58 on the opposite side to the return spring 62 side (on the take-up direction side) faces towards a portion of the sensor holder 42. Rotation of the sensor gear 58 in the take-up direction is accordingly restricted due to the sensor gear 58 contacting the portion of the sensor holder 42.

Internal ratchet teeth are formed inside the sensor gear 58 coaxially to the boss 60. The V-gear 48 enters inside the ratchet teeth. The leading end side of the W-pawl 50 engages with the ratchet teeth of the sensor gear 58 when the leading end side of the W-pawl 50 swings so as to approach the outer edge of the V-gear 48. As stated above, the sensor gear 58 is supported by the boss 60 of the V-gear 48 so as to be capable of turning. When the V-gear 48 rotates in the pull-out direction with the leading end side of the W-pawl 50 in an engaged state with the ratchet teeth of the sensor gear 58, the ratchet teeth of the sensor gear 58 are pressed by the leading end side of the W-pawl 50, and the sensor gear 58 is rotated together with the V-gear 48 in the pull-out direction.

The sensor gear 58 is further formed with a coupling claw attachment portion 72. The coupling claw attachment portion 72 is formed with a support shaft 74 with axial direction aligned with the spool 18 axial direction. A coupling claw 76 is supported by the support shaft 74 so as to be capable of swinging about the support shaft 74.

A leading end of the coupling claw 76 moves towards and away from an outer peripheral portion of the V-gear 48 illustrated in FIG. 1 by swinging about the support shaft 74. Ratchet teeth 78 corresponding to the coupling claw 76 are formed to the outer peripheral portion of the V-gear 48. The leading end of the coupling claw 76 meshes with the ratchet teeth 78 when the coupling claw 76 turns so as to approach the outer peripheral portion of the V-gear 48. The rotation of the V-gear 48 is transmitted to the sensor gear 58 through the ratchet teeth 78, the coupling claw 76, the support shaft 74 and the coupling claw attachment portion 72 when the V-gear 48 rotates in this state in the pull-out direction, thereby turning the sensor gear 58 in the pull-out direction.

As shown in FIG. 1, an acceleration sensor 80 is provided to the sensor holder 42. The acceleration sensor 80 is equipped with a sensor frame 82. The sensor frame 82 is provided with a placement portion 84. The placement portion 84 is a sloping face with a curved or sloping recessed shape open substantially towards the vehicle top side, and a hard sphere 86 is placed on the sloping face. A push-up tab 88 is provided to the upper side of the hard sphere 86.

The push-up tab 88 is supported by a vertical wall that projects from the sensor frame 82, so as to be capable of swinging about an axis with axial direction substantially in the vehicle front-rear direction. When the hard sphere 86 rolls across the placement portion 84 and rides up the sloping face of the placement portion 84, the hard sphere 86 pushes up the push-up tab 88. The coupling claw 76, described earlier, is provided above the push-up tab 88. The push-up tab 88 that has been pushed up by the hard sphere 86 pushes up the coupling claw 76. The leading end of the coupling claw 76 accordingly meshes with the ratchet teeth 78.

A link member 94 configuring a rotation transmission mechanism is provided to the leg plate 14 side of the sensor gear 58 in the vicinity of the coupling claw attachment portion 72. A support body 96 is attached to the leg plate 14 of the frame 12 corresponding to the link member 94. A support shaft 98 is provided to the support body 96 with a shaft direction orientated in the same direction as the axial center direction of the spool 18. A cylindrical body 100 insertable by the support shaft 98 is provided to the link member 94. The link member 94 is supported so as to be capable of rotation about the support shaft 98 by inserting the support shaft 98 into the cylindrical body 100.

An engagement pin 102 is formed to the link member 94. The engagement pin 102 is formed projecting in the same direction as the spool 18 axial direction towards the sensor gear 58 side from a position separated along the link member 94 rotation radial direction from the axial center of the cylindrical body 100, this being the center of rotation of the link member 94. A through hole 104 is formed to the sensor holder 42 corresponding to the engagement pin 102. The engagement pin 102 passes through the through hole 104. The through hole 104 is formed in a circular arc shape that curves about the axial center of the support shaft 98 and the cylindrical body 100. The link member 94 is accordingly capable of rotating about the support shaft 98 by a specific angle even with the engagement pin 102 passing through the through hole 104.

A guide hole 114 is formed at a specific location on the sensor gear 58 shown in FIG. 2, corresponding to the engagement pin 102 that passes through the through hole 104. The guide hole 114 is configured as an elongated hole with an inner width dimension set slightly larger than the outer diameter dimension of the engagement pin 102, and the engagement pin 102 passes through the inside of the guide hole 114. When the sensor gear 58 turns about the axial center of the spool 18, an inner peripheral portion of the guide hole 114 presses the engagement pin 102, and the link member 94 accordingly swings about the support shaft 98.

As shown in FIG. 1, a locking pawl 122 serving as a locking member is supported on the support body 96 by an attachment pin 120 so as to be capable of swinging about an axis with axial direction in the same direction as the axial direction of the support shaft 98. A locking base 124 is provided to the spool 18 corresponding to the locking pawl 122. A portion of the locking base 124 is inserted through the leg plate 14 side open end of the spool 18, and into the spool 18, such that the locking base 124 is coaxial to the spool 18 and capable of relative rotation with respect to the spool 18. However, the torsion shaft 24 penetrates the locking base 124 in a state in which relative rotation is not possible. The locking base 124 is accordingly connected to the spool 18 through the torsion shaft 24 in a state in which relative rotation is not possible.

Ratchet teeth 128 are provided to an outer peripheral portion of the locking base 124. Ratchet teeth (locking teeth) capable of engaging with the ratchet teeth 128 are formed at a leading end side of the locking pawl 122. The ratchet teeth of the locking pawl 122 mesh with the ratchet teeth 128 (the locking base 124) when the locking pawl 122 swings in the direction in which the leading end side of the locking pawl 122 approaches an outer peripheral portion of the ratchet teeth 128. Rotation of the locking base 124 in the pull-out direction is accordingly restricted in a meshed state of the ratchet teeth of the locking pawl 122 with the ratchet teeth 128 (the locking base 124).

An engagement pin 132 configuring the rotation transmission mechanism is formed to the locking pawl 122 at a position at a radial direction displacement to the center of rotation of the locking pawl 122. The engagement pin 132 is formed projecting in the same direction as the axial direction of the spool 18 from a link member 94 side end face of the locking pawl 122. A guide hole (not shown in the drawings) is formed to the link member 94 corresponding to the engagement pin 132. The engagement pin 132 enters the guide hole of the link member 94. The inner peripheral portion of the guide hole of the link member 94 presses the engagement pin 132 when the link member 94 turns about the support shaft 98 in the take-up direction due to the sensor gear 58 rotating in the pull-out direction and the engagement pin 102 being pressed by the inner peripheral portion of the guide hole 114. The ratchet teeth of the locking pawl 122 accordingly approach and mesh with the ratchet teeth 128 of the locking base 124 when the locking pawl 122 swings.

As shown in FIG. 2, a carrier plate 142 serving as a switching section is provided on the opposite side of the sensor gear 58 to the leg plate 14. In the present exemplary embodiment, the carrier plate 142 is formed by molding a synthetic resin material. A through hole 144 is formed in the carrier plate 142. A support portion 146 is formed to the sensor gear 58 corresponding to the through hole 144, and the support portion 146 penetrates the through hole 144. The carrier plate 142 is supported coaxially to the spool 18 by the support portion 146 so as to be capable of relative rotation with respect to the sensor gear 58. A pressing tab (piece) 148 is formed to the carrier plate 142, and a pressing portion 150 separate to the pressing tab 148 is also provided to the carrier plate 142.

A switching lever 152 is provided to the sensor gear 58 corresponding to the pressing tab 148 and the pressing portion 150. The switching lever 152 is provided with a cylindrical portion 154. A support shaft 156 is formed to the sensor gear 58 corresponding to the cylindrical portion 154. The support shaft 156 axial direction is along to the spool 18 axial direction, and the support shaft 156 is fit inserted into the cylindrical portion 154. The switching lever 152 is accordingly supported on the support shaft 156 so as to be capable of swinging about the support shaft 156. A lever shaped contact portion 158 extends out from an outer peripheral portion of the cylindrical portion 154.

The contact portion 158 faces towards the pressing tab 148 and the pressing portion 150 along the carrier plate 142 rotation circumferential direction. When the carrier plate 142 rotates in the pull-out direction, the pressing tab 148 contacts (abuts) the contact portion 158 and presses the contact portion 158, swinging the switching lever 152 about the support shaft 156 towards one side. ON the other hand, when the carrier plate 142 rotates in the take-up direction, the pressing portion 150 contacts (abuts) the contact portion 158, pressing the contact portion 158 and swinging the switching lever 152 about the support shaft 156 towards the other side.

The switching lever 152 is provided with an engagement claw 160. A notch 162 is formed to the sensor gear 58 corresponding to the engagement claw 160. When the switching lever 152 turns about the support shaft 156 towards the one side, a leading end side of the engagement claw 160 passes through the notch 162 and enters inside the sensor gear 58. The leading end of the engagement claw 160 thus engages with the ratchet teeth 78 of the V-gear 48, described above, when the engagement claw 160 enters inside the sensor gear 58. The sensor gear 58 is thereby coupled to the V-gear 48, and the sensor gear 58 is rotated together with the V-gear 48 in the pull-out direction.

The switching lever 152 is further provided with a spring anchor portion 164. The spring anchor portion 164 is inserted into a coil spring 166 from a one end of the coil spring 166. A spring anchor projection 168 formed to the sensor gear 58 is inserted into the coil spring 166 from the other end. With a boundary as an intermediate swing position of the switching lever 152 about the support shaft 156, the coil spring 166 biases the switching lever 152 towards the one side about the support shaft 156 when the switching lever 152 is positioned further to the one side about the support shaft 156 than the boundary. The coil spring 166 biases the switching lever 152 towards the other side about the support shaft 156 when the switching lever 152 is positioned further to the other side about the support shaft 156 than the boundary.

Figure 3:
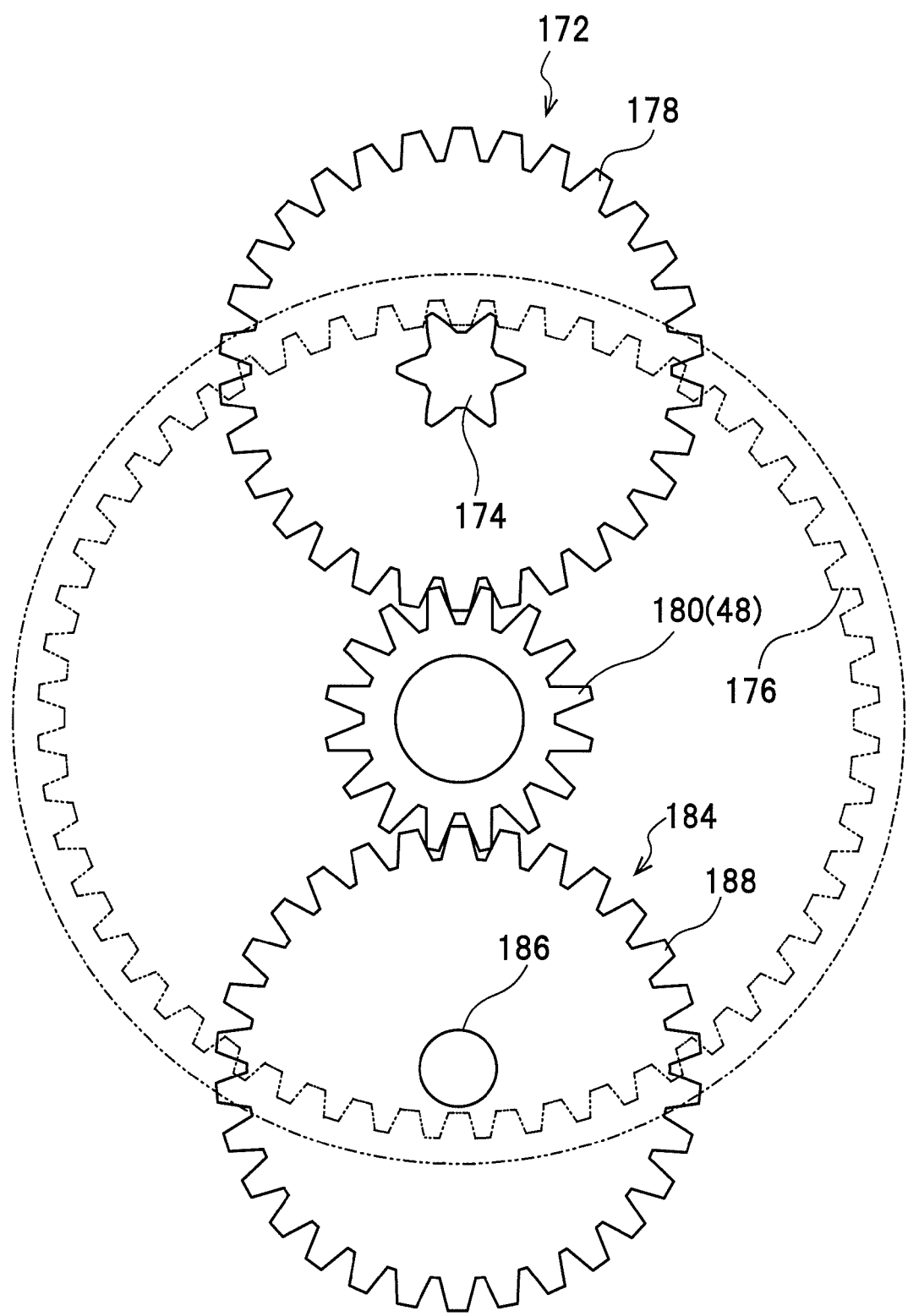
FIG. 3 is a schematic side view illustrating an assembled state of a sun gear, an internal-toothed gear, a planet gear and a restriction member.

A through hole 170 is formed in the carrier plate 142 on the lateral side of the through hole 144. A planet gear 172, formed by molding a synthetic resin material, is attached to the through hole 170. The planet gear 172 is provided with a small diameter gear portion 174. The small diameter gear portion 174 penetrates the through hole 170 and is supported by the carrier plate 142 so as to be capable of rotation centered on the through hole 170. The small diameter gear portion 174 projects out towards the sensor gear 58 side of the carrier plate 142. The sensor gear 58 is provided with an internal-toothed gear 176 corresponding to the small diameter gear portion 174. The internal-toothed gear 176 is formed coaxially to the spool 18 on the face of the sensor gear 58 on the side facing the carrier plate 142. As shown in FIG. 3, the small diameter gear portion 174 of the planet gear 172 meshes with the internal-toothed gear 176 of the sensor gear 58.

The planet gear 172 is also provided with a large diameter gear portion 178 larger than the small diameter gear portion 174. The large diameter gear portion 178 is integrally formed coaxial to the small diameter gear portion 174 on the opposite side of the small diameter gear portion 174 to the sensor gear 58. A sun gear 180 corresponding to the large diameter gear portion 178 is formed to the V-gear 48. The sun gear 180 is integrally formed coaxial to the boss 60 at an end portion of the boss 60 on the opposite side to a main body portion of the V-gear 48. The sun gear 180 projects out further than the carrier plate 142 to the side opposite to the sensor gear 58 in a meshed state of the small diameter gear portion 174 of the planet gear 172 with the internal-toothed gear 176. In this state, as shown in FIG. 3, the sun gear 180 can be made to mesh with the large diameter gear portion 178.

Namely, in the present exemplary embodiment, the sun gear 180, the internal-toothed gear 176 and the planet gear 172 configure a planetary gear mechanism wherein the internal-toothed gear 176 is fixed and rotational force output from the sun gear 180 is transmitted to the planet gear 172. Accordingly, in the present exemplary embodiment, rotation of the sun gear 180 is transmitted to the planet gear 172 with rotation being reduced, the planet gear 172 thus revolves around the sun gear 180 in the same direction as the sun gear 180 rotation direction while the planet gear 172 rotating centered on the through hole 170 (the center of the through hoe 170), and the carrier plate 142 therefore rotates in the revolution direction of the planet gear 172.

In the present exemplary embodiment, the ratio of the revolution speed of the planet gear 172 with respect to the rotational speed of the sun gear 180 (speed reduction ratio) is set such that the number of revolution of the planet gear 172 is less than one revolution for the number of rotations of the spool 18 (namely, the number of rotations of the sun gear 180) required to reach the "fully pulled-out state" from the "specific take-up state".

The forming positions of the pressing tab 148 and the pressing portion 150 on the carrier plate 142 are set such that, with the intermediate swing position of the switching lever 152 about the support shaft 156 as the boundary, in the "fully pulled-out state", the pressing tab 148 can press the contact portion 158 of the switching lever 152 to a position further to the one side about the support shaft 156 than the boundary, and in the "specific take-up state", the pressing portion 150 can press the contact portion 158 of the switching lever 152 to a position further to the other side about the support shaft 156 than the boundary.

A through hole 182 is formed in the carrier plate 142 on the opposite side of the through hole 144 to the through hole 170. A restriction rotating body 184 serving as a restriction member is attached to the through hole 182. The restriction rotating body 184 is formed by molding a synthetic resin material. The restriction rotating body 184 is provided with a shaft portion 186. The shaft portion 186 is fit inserted into the through hole 182 and is rotatably supported by the carrier plate 142. The restriction rotating body 184 is further provided with a gear portion 188 that is larger than the shaft portion 186. The gear portion 188 is integrally formed coaxial to the shaft portion 186 on the opposite side of the shaft portion 186 to the sensor gear 58.

As shown in FIG. 3, the gear portion 188 meshes with the sun gear 180 similarly to the large diameter gear portion 178 of the planet gear 172. The restriction rotating body 184 is accordingly rotated about the through hole 182 (the center of the through hole 182) due to rotation of the sun gear 180. Moreover, since the through hole 182 is formed in the carrier plate 142, when the carrier plate 142 rotates about the sun gear 180 due to the sun gear 180 rotating, the restriction rotating body 184 also revolves together with the carrier plate 142 (namely, together with the planet gear 172).

Operation and Advantageous Effects of the Present Exemplary Embodiment

Explanation follows regarding operation and advantageous effects of the present exemplary embodiment.

In the webbing take-up device 10, when the vehicle enters a state of sudden deceleration with the webbing 20 pulled out from the spool 18 and in a mounted state to an occupant, the hard sphere 86 rolls towards the vehicle front side under inertia, thereby running up the sloping face of the placement portion 84. The hard sphere 86 pushes up the push-up tab 88 when the hard sphere 86 runs up the sloping face of the placement portion 84 in this way. The pushed-up push-up tab 88 engages with the coupling claw 76 of the sensor gear 58 and pushes up and swings the coupling claw 76. The coupling claw 76 accordingly meshes with the ratchet teeth 78 of the V-gear 48.

The webbing 20 is pulled by the body of an occupant when the body of the occupant moves substantially towards the vehicle front side under inertia during deceleration of the vehicle. When the webbing 20 is thus pulled, the spool 18 rotates in the pull-out direction. The torsion shaft 24 rotates in the pull-out direction together with the spool 18 when the spool 18 rotates in the pull-out direction, and the V-gear 48 is therefore rotated in the pull-out direction. When the V-gear 48 is thus rotated in the pull-out direction, the W-pawl 50 and the inertia mass 52 generally rotate in the pull-out direction together with the V-gear 48.

However, when the V-gear 48 is rotated in the pull-out direction at a specific rate of acceleration or greater, due to inertia, the inertia mass 52 attempts to remain in position without rotating (namely, the inertia mass 52 is unable to follow the rotation of the V-gear 48). As a result, relative rotation against the biasing force of the compression coil spring 54 occurs between the V-gear 48 rotating in the pull-out direction and the inertia mass 52 that is unable to follow this rotation. The inertia mass 52 consequently rotates in the take-up direction relative to the V-gear 48.

The inertia mass 52 presses the W-pawl 50 when such relative rotation occurs in the inertia mass 52, swinging the W-pawl 50 about its base end side so as to make the leading end side of the W-pawl 50 swing in a direction to approach the outer peripheral edge of the V-gear 48. The leading end side of the thus swung W-pawl 50 approaches and meshes with the ratchet teeth of the sensor gear 58.

As described above, when the V-gear 48 rotates in the pull-out direction in a meshed state of the coupling claw 76 with the ratchet teeth 78 of the V-gear 48, or in a meshed state of the leading end side of the W-pawl 50 with the ratchet teeth of the sensor gear 58, this rotation of the V-gear 48 is transmitted to the sensor gear 58 and the sensor gear 58 is turned together with the V-gear 48 in the pull-out direction, against the biasing force of the return spring 62.

When the sensor gear 58 turned in this manner in the pull-out direction, the inner peripheral portion of the guide hole 114 formed to the sensor gear 58 presses the outer peripheral portion of the engagement pin 102, swinging the link member 94 in the take-up direction. When the link member 94 swings in the take-up direction, the inner peripheral portion of the guide hole formed to the link member 94 presses the outer peripheral portion of the engagement pin 132, swinging the locking pawl 122 in the take-up direction. The locking pawl 122 consequently approaches the locking base 124, and the ratchet teeth of the locking pawl 122 mesh with the ratchet teeth 128 of the locking base 124, restricting rotation of the locking base 124 in the pull-out direction.

Since the locking base 124 is connected to the spool 18 through the torsion shaft 24 in a state in which relative rotation is not possible, rotation of the spool 18 in the pull-out direction is restricted due to rotation of the locking base 124 in the pull-out direction being restricted. The webbing 20 is accordingly restricted from being pulled out from the spool 18, and, for example in a vehicle sudden deceleration state, the body of an occupant attempting to move towards the vehicle front side under inertia can accordingly be strongly restrained by the webbing 20.

On the other hand, the spool 18 rotates in the pull-out direction when the webbing 20 is pulled and the webbing 20 is pulled out from the spool 18. When the spool 18 rotates in the pull-out direction in this way, the V-gear 48 rotates together with the spool 18 in the pull-out direction, and the sun gear 180 that is a portion of the V-gear 48 accordingly also rotates in the pull-out direction. Rotation of the sun gear 180 in the pull-out direction is transmitted to the planet gear 172 with being reduced, and the planet gear 172 accordingly rotates about the axis thereof in the take-up direction that is the opposite direction to the pull-out direction that is the rotation direction of the sun gear 180.

The thus rotating planet gear 172 is meshed with the internal-toothed gear 176, and the rotational force of the planet gear 172 is accordingly transmitted to the internal-toothed gear 176, attempting to rotate the internal-toothed gear 176 in the take-up direction. The sensor gear 58 to which the internal-toothed gear 176 is supported by the boss 60 of the V-gear 48 so as to be capable of rotating. However, as explained above, rotating of the sensor gear 58 in the take-up direction is restricted due to a portion of the sensor holder 42 abutting the anchor portion of the sensor gear 58 to the return spring 62 from the take-up direction side.

Accordingly, even if rotational force from the planet gear 172 is transmitted to the internal-toothed gear 176, the internal-toothed gear 176, that is to say, the sensor gear 58, does not turn in the take-up direction. The planet gear 172 accordingly rotates about the axis thereof as described above while revolving (rotating) around the sun gear 180 in the pull-out direction.

When the planet gear 172 revolves in the pull-out direction, the carrier plate 142 rotates together with the planet gear 172 in the pull-out direction. The pressing tab 148 of the carrier plate 142 accordingly approaches the contact portion 158 of the switching lever 152. The pressing tab 148 of the carrier plate 142 abuts the contact portion 158 of the switching lever 152 when the spool 18 has rotated in the pull-out direction up to the point where the "fully pulled-out state" is reached. The pressing tab 148 then presses the contact portion 158 further to the one side about the support shaft 156 than the boundary which is at the intermediate swing position of the switching lever 152 about the support shaft 156.

When the contact portion 158 has been pressed by the pressing tab 148 and rotated (swung) in this manner, the switching lever 152 then swings further to the one side about the support shaft 156 by the biasing force of the coil spring 166. The leading end side of the engagement claw 160 of the switching lever 152 accordingly passes through the notch 162 formed at the sensor gear 58 and enters inside the sensor gear 58. When the engagement claw 160 thus enters inside the sensor gear 58, the leading end of the engagement claw 160 engages with the ratchet teeth 78 of the V-gear 48, described above.

In this state, when the V-gear 48 rotates in the pull-out direction, rotation of the V-gear 48 is transmitted to the sensor gear 58, and the sensor gear 58 rotates together with the V-gear 48 in the pull-out direction, against the biasing force of the return spring 62. Namely, this is a state is the same as the meshed state of the coupling claw 76 with the ratchet teeth 78 of the V-gear 48 and as the meshed state of the leading end side of the W-pawl 50 with the ratchet teeth of the sensor gear 58. Accordingly, when the spool 18 rotates in the pull-out direction in this state, the ratchet teeth of the locking pawl 122 mesh with the ratchet teeth 128 of the locking base 124, and rotation of the locking base 124 in the pull-out direction, and therefore rotation of the spool 18 in the pull-out direction, are restricted.

That is to say, the webbing 20 cannot be pulled from the spool 18 in this state, irrespective of, for example, the state of the vehicle (whether or not the vehicle has decelerated suddenly).

In this state, when the spool 18 rotates in the take-up direction and takes up the webbing 20, the spool 18, and therefore the sun gear 180, also rotate in the take-up direction. When the sun gear 180 rotates in the take-up direction, the planet gear 172 rotates about the axis thereof in the pull-out direction.

The rotational force of the thus rotating planet gear 172 is transmitted to the internal-toothed gear 176, attempting to rotate the sensor gear 58 at which the internal-toothed gear 176 is formed to in the pull-out direction. However, as described above, rotation of the sensor gear 58 in the pull-out direction is suppressed since the sensor gear 58 is biased in the take-up direction by the return spring 62.

The planet gear 172 accordingly revolves (rotates around) around the sun gear 180 in the take-up direction while rotating about the axis thereof with meshed with the internal-toothed gear 176. The carrier plate 142 is accordingly rotated in the take-up direction, and the pressing portion 150 of the carrier plate 142 approaches the contact portion 158 of the switching lever 152. The pressing portion 150 of the carrier plate 142 abuts the contact portion 158 of the switching lever 152 when the spool 18 has rotated in the take-up direction up to the point where the "specific take-up state" is reached. The pressing portion 150 then presses the contact portion 158 further to the other side about the support shaft 156 than the boundary which is at the intermediate swing position of the switching lever 152 about the support shaft 156.

When the contact portion 158 is pressed by the pressing portion 150 and swung in this manner, the switching lever 152 is swung further to the other side about the support shaft 156 by the biasing force of the coil spring 166. The engagement between the engagement claw 160 of the switching lever 152 and the ratchet teeth 78 of the V-gear 48 is accordingly released. Rotation of the spool 18 in the pull-out direction is accordingly enabled.

In the present exemplary embodiment, the internal-toothed gear 176 that meshes with the small diameter gear portion 174 of the planet gear 172 is formed at the sensor gear 58. The sensor gear 58 is supported by the circular cylinder shaped boss 60 formed at the V-gear 48. When the V-gear 48 rotates in the pull-out direction in the meshed state of the coupling claw 76 with the ratchet teeth 78 of the V-gear 48 or the meshed state of the leading end side of the W-pawl 50 with the ratchet teeth of the sensor gear 58, the sensor gear 58 rotates in the pull-out direction together with the V-gear 48. Due to such a configuration, the sensor gear 58 is displaced in the direction of the external force due to receiving the external force in the rotation radial direction thereof.

For example, when the sensor gear 58 is displaced towards the opposite side of the planet gear 172 to the sun gear 180, the shaft portion 186 of the restriction rotating body 184 positioned on the opposite side of the sun gear 180 to the planet gear 172 is pressed by the internal-toothed gear 176 towards the sun gear 180 side. Due to the shaft portion 186 of the restriction rotating body 184 being pressed towards the sun gear 180 side, the gear portion 188 of the restriction rotating body 184 presses the sun gear 180 in this pressing direction. The direction of the pressing force the sun gear 180 receiving in this manner is accordingly the same direction as the displacement direction of the sensor gear 58 described above. The sun gear 180 therefore presses the large diameter gear portion 178 of the planet gear 172 in the same direction as the displacement direction of the sensor gear 58. The internal-toothed gear 176 can accordingly be prevented or effectively suppressed from coming away from the small diameter gear portion 174 of the planet gear 172, even in a case in which displacement of the sensor gear 58 occurs as described above.

In other words, good operational performance can be secured even in a case in which the internal-toothed gear 176 is formed at the sensor gear 58, since the internal-toothed gear 176 can be prevented or effectively suppressed from coming away from the small diameter gear portion 174 of the planet gear 172 even in a case in which the internal-toothed gear 176 is formed at the sensor gear 58. Since the internal-toothed gear 176 can be formed at a rotating member such as the sensor gear 58 in this manner, it is accordingly not necessary that the internal-toothed gear is fixed to an additional member which is different from the sensor gear 58.

Moreover, since the internal-toothed gear 176 can be prevented or effectively suppressed from coming away from the small diameter gear portion 174 of the planet gear 172 by providing the restriction rotating body 184, there is no need to set a particularly high rigidity for members such as the planet gear 172, the carrier plate 142 that supports the planet gear 172, the internal-toothed gear 176 (namely, the sensor gear 58), and the sun gear 180 (namely, the V-gear 48). Members such as the carrier plate 142, the planet gear 172, the internal-toothed gear 176 and the sun gear 180 can accordingly be formed from a synthetic resin material as in the present exemplary embodiment, and a reduction in size and reduction in weight can be achieved for these components.

Moreover, the restriction rotating body 184 is attached to the carrier plate 142 by fit inserting the shaft portion 186 into the through hole 182 of the carrier plate 142. Due thereto, the restriction rotating body 184 rotates (revolves) together with when the carrier plate 142 rotates in accompany with the planet gear 172. The restriction rotating body 184 is therefore positioned on the opposite side of the sun gear 180 to the planet gear 172 whatever the rotation position of the carrier plate 142. There is accordingly no need for a configuration, separate to the carrier plate 142, for making the restriction rotating body 184 rotate to follow the revolving of the planet gear 172.

As shown in FIG. 3, the restriction rotating body 184 is not provided with a portion that meshes with the internal-toothed gear 176 (the shaft portion 186 does not configures a gear portion which meshed with the internal-toothed gear 176, therefore, the shaft portion 186 does not mesh with the internal-toothed gear 176), accordingly, rotation of the sun gear 180 is not transmitted to the carrier plate 142. Namely, it is sufficient merely to adjust the rotation position of the restriction rotating body 184 such that the gear portion 188 of the restriction rotating body 184 meshes with the sun gear 180 when assembling the restriction rotating body 184. Assembly of the restriction rotating body 184 is accordingly easily accomplished even after the planet gear 172 has been assembled. The planet gear 172 can accordingly be assembled prior to assembling of the restriction rotating body 184, allowing easy assembly of the planet gear 172.

What is claimed is:

1. A webbing take-up device comprising:
a spool to which a length direction base end side of a webbing is anchored, and that takes up and stores the webbing by rotating in a take-up direction;
a sun gear that rotates integrally with the spool or that rotates according to the spool;
an internal-toothed gear that is provided coaxially to the sun gear and to the outside of the sun gear;
a planet gear that is provided at one lateral side of the sun gear, that directly meshes with both the sun gear and the internal-toothed gear, and to which rotation of the sun gear is transmitted such that the planet gear revolves around the sun gear while rotating about a rotation axis of the planet gear, a reduction ratio being set such that a number of revolutions of the planet gear is less than one revolution for a number of rotations of the spool that is required from a specific take-up state in which a specific length of the webbing is taken up on the spool to reach a fully pulled-out state in which the webbing is completely pulled out from the spool;
a locking mechanism that is actuated to restrict rotation of the spool in a pull-out direction that is the opposite direction from the take-up direction while permitting rotation of the spool in the take-up direction;
a switching section that is capable of coaxial relative rotation with respect to the sun gear, that rotatably supports the planet gear, that rotates relative to the sun gear due to revolution of the planet gear, that actuates the locking mechanism due to the switching section reaching a rotation position thereof corresponding to the fully pulled-out state of the spool, and that releases actuation of the locking mechanism due to the switching section reaching a rotation position corresponding to the specific take-up state of the spool; and
a restriction member that is provided at another lateral side of the sun gear, that is configured such that rotation of the sun gear is not transmitted to the switching section, and that causes the sun gear to follow displacement of the internal-toothed gear with respect to the sun gear along a rotation radial direction of the sun gear,
wherein the restriction member does not directly mesh with the internal-toothed gear.

2. The webbing take-up device of claim 1 further comprising a rotating member that is capable of rotating about an axis with an axial direction in the same direction as a rotation axial direction of the sun gear, and that actuates the locking mechanism by rotating, wherein the internal-toothed gear is formed at the rotating member.

3. The webbing take-up device of claim 1, wherein the restriction member is rotatably supported by the switching section.

4. The webbing take-up device of claim 2, wherein the restriction member is rotatably supported by the switching section.

5. The webbing take-up device of claim 4, wherein the restriction member is provided on the opposite side of the sun gear from the planet gear.

6. The webbing take-up device of claim 4, wherein:
the planet gear includes a large diameter gear portion, and a small diameter gear portion provided integrally with and coaxially to the large diameter gear portion,
the restriction member includes a gear portion, and an axial portion provided integrally with and coaxially to the gear portion,
the large diameter gear portion meshes with the sun gear and the gear portion meshes with the sun gear,
the small diameter gear portion meshes with the internal-toothed gear, and
the restriction member does not have a portion that meshes with the internal-toothed gear.

7. The webbing take-up device of claim 6, wherein
the small diameter gear portion is rotatably inserted in a first hole portion formed in the switching section to meshes with the internal-toothed gear, and
the axial portion is rotatably inserted in a second hole portion formed in the switching section, the axial portion not meshing with the internal-toothed gear.

8. The webbing take-up device of claim 7, wherein the large diameter gear portion meshes with the sun gear at the opposite side of the sun gear from the gear portion.

9. The webbing take-up device of claim 3, wherein the restriction member is configured to include a gear portion that meshes with the sun gear.

10. The webbing take-up device of claim 1, wherein the restriction member is provided on the opposite side of the sun gear from the planet gear.

11. The webbing take-up device of claim 1, wherein the restriction member meshes with the sun gear, and the restriction member does not have a portion that directly meshes with the internal-toothed gear.

12. A webbing take-up device comprising:
a spool to which a length direction base end side of a webbing is anchored, and that takes up and stores the webbing by rotating in a take-up direction;
a sun gear that rotates integrally with the spool or that rotates according to the spool;
an internal-toothed gear that is provided coaxially to the sun gear and to the outside of the sun gear;
a planet gear that is provided at one lateral side of the sun gear, that directly meshes with both the sun gear and the internal-toothed gear, and to which rotation of the sun gear is transmitted such that the planet gear revolves around the sun gear while rotating about a rotation axis of the planet gear, a reduction ratio being set such that a number of revolutions of the planet gear is less than one revolution for a number of rotations of the spool that is required from a specific take-up state in which a specific length of the webbing is taken up on the spool to reach a fully pulled-out state in which the webbing is completely pulled out from the spool;
a locking mechanism that is actuated to restrict rotation of the spool in a pull-out direction that is the opposite direction from the take-up direction while permitting rotation of the spool in the take-up direction;
a switching section that is capable of coaxial relative rotation with respect to the sun gear, that rotatably supports the planet gear, that rotates relative to the sun gear due to revolution of the planet gear, that actuates the locking mechanism due to the switching section reaching a rotation position thereof corresponding to the fully pulled-out state of the spool, and that releases actuation of the locking mechanism due to the switching section reaching a rotation position corresponding to the specific take-up state of the spool; and a second planet gear that meshes with the sun gear and is provided at another lateral side of the sun gear and that is configured such that the rotation of the sun gear is not transmitted to the switching section, and that causes the sun gear to follow displacement of the internal-toothed gear with a respect to the sun gear along a rotation radial direction of the sun gear, wherein the second planet gear does not directly mesh with the internal-toothed gear.

* * * * *